United States Patent

[19]

Muramatsu

[11] 3,962,708
[45] June 8, 1976

[54] ELECTRIC SHUTTER OPERATING CIRCUITS

[75] Inventor: Sadao Muramatsu, Sagamihara, Japan

[73] Assignee: Yashica Co., Ltd., Tokyo, Japan

[22] Filed: May 3, 1974

[21] Appl. No.: 466,819

[30] Foreign Application Priority Data
May 11, 1973 Japan............................ 48-52339

[52] U.S. Cl................................. 354/51; 354/24; 354/50; 354/60 R
[51] Int. Cl.$^2$.......................................... G03B 7/08
[58] Field of Search............... 354/24, 50, 51, 60 R

[56] References Cited
UNITED STATES PATENTS

| | | | |
|---|---|---|---|
| 3,690,230 | 9/1972 | Mori et al............................ | 354/51 |
| 3,809,992 | 7/1974 | Negishi................................ | 354/60 |
| 3,821,754 | 6/1974 | Nobusawa............................ | 354/51 |
| 3,855,603 | 12/1974 | Ichihashi.............................. | 354/51 |

OTHER PUBLICATIONS

"Photo Devices Have You in the Dark", D. D. Snyder, *Electronic Design*, Feb. 1, 1969, pp. 60–64. 5

Primary Examiner—L. T. Hix
Assistant Examiner—Russell E. Adams, Jr.
Attorney, Agent, or Firm—Charles W. Helzer

[57] ABSTRACT

In an electric shutter operating circuit of a photographic camera wherein the shutter is operated in accordance with the photoelectric current produced by a photoelectric element, there are provided a D. C. source and an operational amplifier having two inputs connected across the photoelectric element, a first impedance element with one terminal connected to one input of the operational amplifier for passing the photoelectric current, a second impedance element connected between a negative pole of the D. C. Source and the other input of the operational amplifier, a feedback circuit extending between the input and output of the operational amplifier for passing the feedback current through the second impedance element, an integrating capacitor which begins to integrate the feedback current when the shutter release button is depressed, a shutter trigger circuit connected to the output of the operational amplifier for closing the shutter when the voltage across the integrating capacitor reaches a predetermined value, and a constant current circuit connected to the output of the operational amplifier. The constant current from said constant current circuit is small and the sum of said constant current and the output of the operational amplifier is equal substantially to the feedback current which is proportional to the photoelectric current. Hence in the normal brightness range the shutter time is determined by said feedback current which is proportional to the photoelectric current whereas under low brightness conditions such that the output current from the operational amplifier is reduced to zero, the shutter time is determined by small constant current from constant current circuit.

3 Claims, 3 Drawing Figures

ELECTRIC SHUTTER OPERATING CIRCUITS

BACKGROUND OF THE INVENTION

This invention relates to an electric shutter operating circuit for a photograhic camera capable of responding to light of extremely low intensity.

As diagrammatically shown in FIG. 1, a prior art device responsive to light of extremely low intensity for automatically setting the exposure time of a photographic camera comprises a light receiving element CdS such as a CdS photoconductor, a capacitor C connected in series with the light receiving element, a resistor R connected in parallel with the light receiving element and a trigger circuit TR. This device is constructed in a manner such that the brightness of the object tends to establish either the relation $R>>R_c$ or the relationship $R<<R_c$ where R represents the resistance value of resistor R, and $R_c$ that of the photoconductor CdS. Under brightness conditions where $R>>R_c$, the shutter time is determined by $R_c$ and capacitor C whereas at another brightness in which $R<<R_c$ the shutter time is determined by the value of R. For this reason, even at an extremely low brightness condition wherein $R_c$ is infinite, the time constant of the circuit consisting of R and C functions to close the shutter. However, under brightness conditions where the resistance values of R and $R_c$ are substantially equal, their combined value reduces to one half so that the exposure value becomes less than 1 EV, thus causing an exposure error. Further, under brightness conditions where $R_c>R$, the parallel resistor R further increases the exposure error.

SUMMARY OF THE INVENTION

It is an object of this invention to provide an improved shutter operating circuit which makes it possible to take a picture with an extremely accurate exposure time even under extremely low brightness conditions affecting the object.

Another object of this invention is to provide a novel electric shutter operating circuit which can automatically close the shutter after a predetermined time interval even if the shutter release button is operated inadvertently under low brightness conditions.

Still another object of this invention is to provide an improved shutter operating circuit wherein the shutter time always is made to be proportional to the brightness of an object to be photographed.

A further object of this invention is to provide a novel electric shutter operating circuit in which the shutter time is determined not only upon the brightness of the object but also is determined by information regarding the opening of the iris diaphragm and the light sensitivity of the film used.

According to this invention these and other objects can be accomplished by providing an electric shutter operating circuit for a photographic camera wherein the shutter is operated in accordance with the output of a photoelectric element that responds to the brightness of an object, characterized in that the electric shutter operating circuit comprises a D.C. source and an operational amplifier having two inputs connected across the photoelectric element, a first impedance element with one terminal connected to one input of the operational amplifier, the first impedance element being connected in a circuit which passes the the photoelectric current flowing through the photoelectric element, a second impedance. element connected between a negative pole of the D.C. source and the other input of the operational amplifier, a feedback circuit extending between the output and said other input of the operational amplifier for passing feedback current through the second impedance element, an integrating capacitor connected in the feedback circuit, switch means interlocked with the shutter release button of the camera for causing the integrating capacitor to begin to integrate the feedback current when the shutter release button is depressed, a shutter trigger circuit connected to the output of the operational amplifier for closing the shutter of the camera when the voltage across the integrating capacitor reaches a predetermined value and a constant current circuit connected to the output of the operational amplifier. The constant current from said constant current circuit is small so that the sum of said constant current and the output of the operational amplifier is equal substantially to the feedback current which is proportional to the photoelectric current. Hence, in the normal brightness range the shutter time is determined by said feedback current which is proportional to the photoelectric current whereas under low brightness conditions such that the output current from the operational amplifier is reduced to zero, the shutter time is determined by the small constant current from constant current circuit.

According to another feature of this invention, there is also provided a setting circuit which produces an information signal regarding the opening of the iris diaphragm and the sensitivity of the film used, and the information signal is added to the photoelectric current flowing through the photoelectric element.

BRIEF DESCRIPTION OF THE DRAWING

Further objects and advantages of the invention can be more fully understood from the following detailed description taken in conjunction with the accompanying drawing in which.

DESCRIPTION OF THE PREFERRED EMBODIMENT

Figure 1:
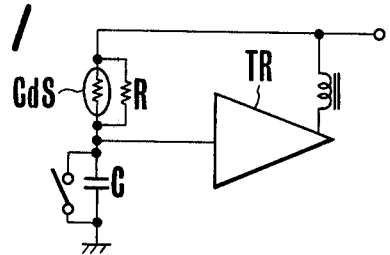
FIG. 1 is a diagrammatic representation of a prior art electric shutter operating circuit capable of operating under extremely low brightness conditions.
Figure 2:
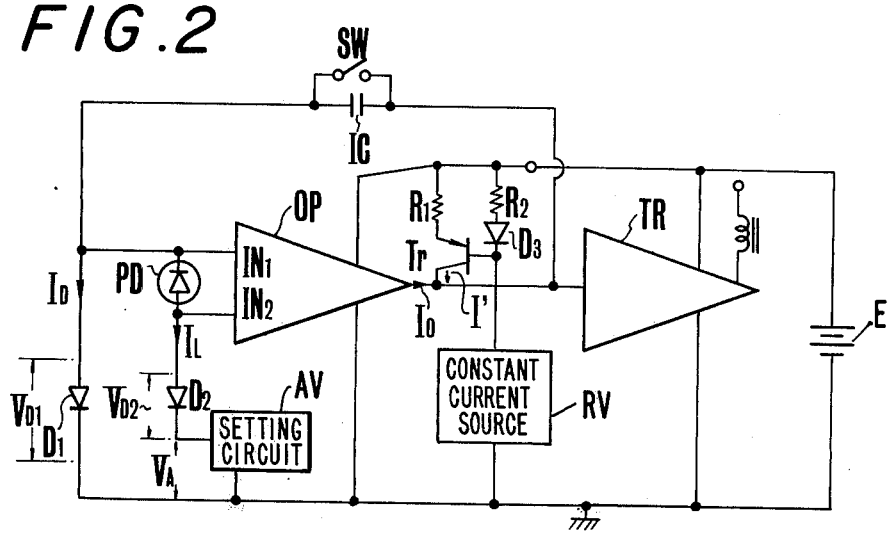
FIG. 2 shows a connection diagram of one embodiment of the electric shutter operating circuit embodying the invention.

A preferred embodiment of this invention shown in FIG. 2 comprises an operational amplifier OP and a photoelectric element PD which is poled as shown and connected between a pair of inputs $IN_1$ and $IN_2$ of the operational amplifier OP. There are also provided a diode $D_1$ with its anode electrode connected to the first input $IN_1$ of the operational amplifier OP and its cathode electrode connected to the negative pole of a D.C. source E, and another diode $D_2$ with its anode electrode connected to the second input $IN_2$ of the operational amplifier OP and its cathode electrode connected to the negative pole of said D.C. source E through a setting circuit AV RV for setting the shutter informations regarding the degree of iris opening, the ASA sensitivity of the film used, etc.

An integrating capacitor IC is included in a feedback circuit between the output and the first input $IN_1$ of the operational amplifier OP, and a switch SW is connected in parallel with capacitor IC. The switch SW is interlocked with the shutter release button (not shown) of the camera such that when the shutter release button is depressed the switch SW is opened. A trigger circuit TR is provided which operates when the voltage across the integrating capacitor IC reaches a predetermined value. A transistor Tr is provided with its collector electrode connected to the output of the operational amplifier OP, its emitter connected to the positive of DC source E through resistor $R_1$ and its base electrode connected to said DC source through serially connected diode $D_3$ and resistor $R_2$, and to the positive pole of a constant current source RV. The constant current source RV may constitute any conventional known constant current source.

The shutter operating circuit described above operates as follows after depression of the shutter release button and opening of switch SW. When the light from an object is received by the photoelectric element PD, a photoelectric current IL proportional to the intensity of the light flows through diode $D_2$ thus creating a voltage drop $VD_2$ as shown by the following equation:

$$VD_2 = \frac{kT}{q} \ln \frac{I_L}{I_S} \qquad 1$$

where IS represents the saturation current of the diode, and kT/q a constant. Since the output of the operational amplifier OP is fed back to its first input $IN_1$, a feedback current ID flows through diode $D_1$ to create a voltage drop $VD_1$ across the diode $D_1$ as shown by the following equation.

$$VD_1 = \frac{kT}{q} \ln \frac{I_D}{I_S} \qquad 2$$

Thus, the sum of the voltage VA set by the setting circuit AV and the voltage $VD_2$ across diode $D_2$, or VA + $VD_2$, is applied to the second input $IN_2$ of the operational amplifier OP whereas the voltage $VD_1$ across diode $D_1$ is applied to the first input $IN_1$ and the operational amplifier is constructed to feedback its output to diode $D_1$ to satisfy the following equation.

$$V_A + V_{D1} = V_{D2} \qquad 3$$

Accordingly, the current ID can be expressed as follows:

$$ID = I_L \exp \frac{qV_A}{kT} \qquad 4$$

This equation shows that the current ID flowing through diode $D_1$ is proportional to the photoelectric current IL, and that it is possible to set the feedback current ID to any desired value by varying the output voltage VA of the setting circuit AV. While the feedback current ID is flowing, when the shutter release button is depressed to open switch SW, the charging of the integrating capacitor is commenced. When the voltage across capacitor IC reaches a predetermined value, the trigger circuit TR operates to close the shutter, thus completing the exposure.

The foregoing description refers to a condition wherein the brightness of the object is relatively high. The feedback current $I_D$ shown by equation (4) is defined as the sum of output current $I_o$ of the operational amplifier OP and the constant small current I' from constant current circuit comprising resistors $R_1$, $R_2$, diode $D_3$, transistor Tr, and a constant current source RV. When the brightness decreases, feedback current $I_D$ decreases and the output current $I_o$ decreases since small current I' is constant. Thus, when $I_o = 0$ and $I_D = I'$, in other words, under such low brightness that $$I_L = I' / \exp. \frac{q^{VA}}{kt},$$

the operational amplifier OP becomes inoperative. Thus, the output current $I_o$ from the operational amplifier OP is reduced to zero and then the integrating capacitor IC is charged gradually by the small current I' that flows through the collector electrode of transistor Tr. When the voltage of the integrating capacitor IC reaches a predetermined value, the trigger circuit TR operates to close the shutter thus terminating the exposure. Thus, even under low brightness conditions it is possible to control the operation of the shutter with accurate exposure times. Even when the shutter release button is inadvertently depressed the shutter is automatically closed so that it is possible to prevent the wear of the source. Under these conditions, a shutter time of about 16 seconds is possible.

Figure 3:
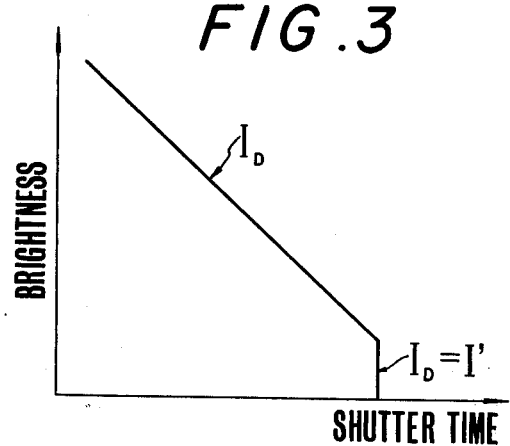
FIG. 3 is a graph showing the relationship between the shutter time and the brightness of the object.

Under normal brightness conditions, the small current I' is added to the output current $I_o$ of the operational amplifier OP thus forming feedback current ID which functions to charge the integrating capacitor IC, but while the operational amplifier OP is operating, the feedback current ID is proportional to the photoelectric current IL as shown by equation 4. The plot shown in FIG. 3 shows the relationship between the brightness and the shutter time. As can be noted from FIG. 3, until the output current $I_o$ from the operational amplifier OP reduces to zero the shutter time varies along a straight line as the brightness of the object varies, thus assuring correct exposure times.

As has been described hereinabove, this invention provides an electric shutter operating circuit in which a photoelectric element is used as the light receiving element, the photoelectric current produced by the photoelectric element is amplified to charge an integrating capacitor, and the current I' from the independent source of constant current constitutes part of the feedback current $I_o$ under and conditions of brightness so that it is possible to accurately control the exposure time or shutter time at extremely low brightness conditions. Further, in accordance with this invention even when the shutter release button is inadvertently depressed under low brightness conditions the shutter is closed automatically at the end of a predetermined interval, so that it is possible to prevent undue wear of the source. In the novel shutter operating circuit constructed in accordance with this invention, it should be noted that the small current I' constitutes a part of feedback current $I_D$ under any brightness and is a constant current having a small value. If the brightness exceeds a certain level, the relation $L_L \alpha I_o + I'$ is maintained and $I_L$ is correctly Proportional to $I_D$, whereas if the brightness is under said certain level, the shutter is made to close at a constant shutter time determined by I' and the shutter is prevented from being kept open.

Further, information regarding the ASA sensitivity of the film and the opening of the iris diaphragm is also set by the setting circuit AV making it possible to provide highly accurate exposures not only under normal brightness conditions but also under low brightness conditions.

Although the invention has been shown and described in terms of a preferred embodiment it should be understood that the invention is by no means limited to such specific embodiment and that a number of changes and modifications are permissible without departing from the spirit and scope of the invention as defined in the appended claims.

What is claimed is:

1. An electric shutter operating circuit for a photographic camera, comprising a photoelectric element for producing a photoelectric current in response to the brightness of an object, an operational amplifier having two inputs connected across said photoelectric element, a first impedance element having one terminal connected to one input of said operational amplifier and being connected in series circuit relationship with said photoelectric element so as to pass said photoelectric current, a second impedance element connected to the other input of said operational amplifier in parallel circuit relationship with said series connected first impedance element and said photoelectric element, a feedback circuit extending between the output and said other input of said operational amplifier for passing feedback current through said second impedance element, an integrating capacitor connected in said feedback circuit, switch means interlocked with the shutter release button of said camera for causing said integrating capacitor to begin to integrate the feedback current upon said shutter release button being depressed, a shutter trigger circuit connected to the output of said operational amplifier for closing the shutter of said camera upon the voltage across said integrating capacitor reaching a predetermined value, and constant current circuit means connected to the output of said operational amplifier in parallel circuit relationship with said shutter trigger circuit for normally adding to the output from said operational amplifier a relatively small current in contrast to the normal feedback current obtained under normal brightness conditions whereby the sum of the small constant current and the output from the operational amplifier equals the feedback current which is proportional to the photoelectric current and under low brightness conditions where the output current from the operational amplifier is reduced to zero the shutter trigger circuit will be actuated in time by the small current supplied through the feedback circuit to the integrating capacitor from the constant current circuit means.

2. The electric shutter operating circuit according to claim 1 wherein said constant current circuit means comprises a source of constant current, a transistor having a base electrode connected to one terminal of said constant current source, a collector electrode connected to the output of said operational amplifier, and an emitter electrode, a D. C. source, an emitter resistor, said emitter electrode being connected to said DC source through said emitter resistor, and a series circuit including a resistor and a diode, said series circuit being connected between the base electrode of said transistor and said DC source.

3. The electric shutter operating circuit according to claim 1 wherein said first and second impedance elements comprises diodes.

* * * * *